Nov. 5, 1935.  G. F. CAVANAGH  2,020,135
RUNNING BOARD
Filed April 29, 1932
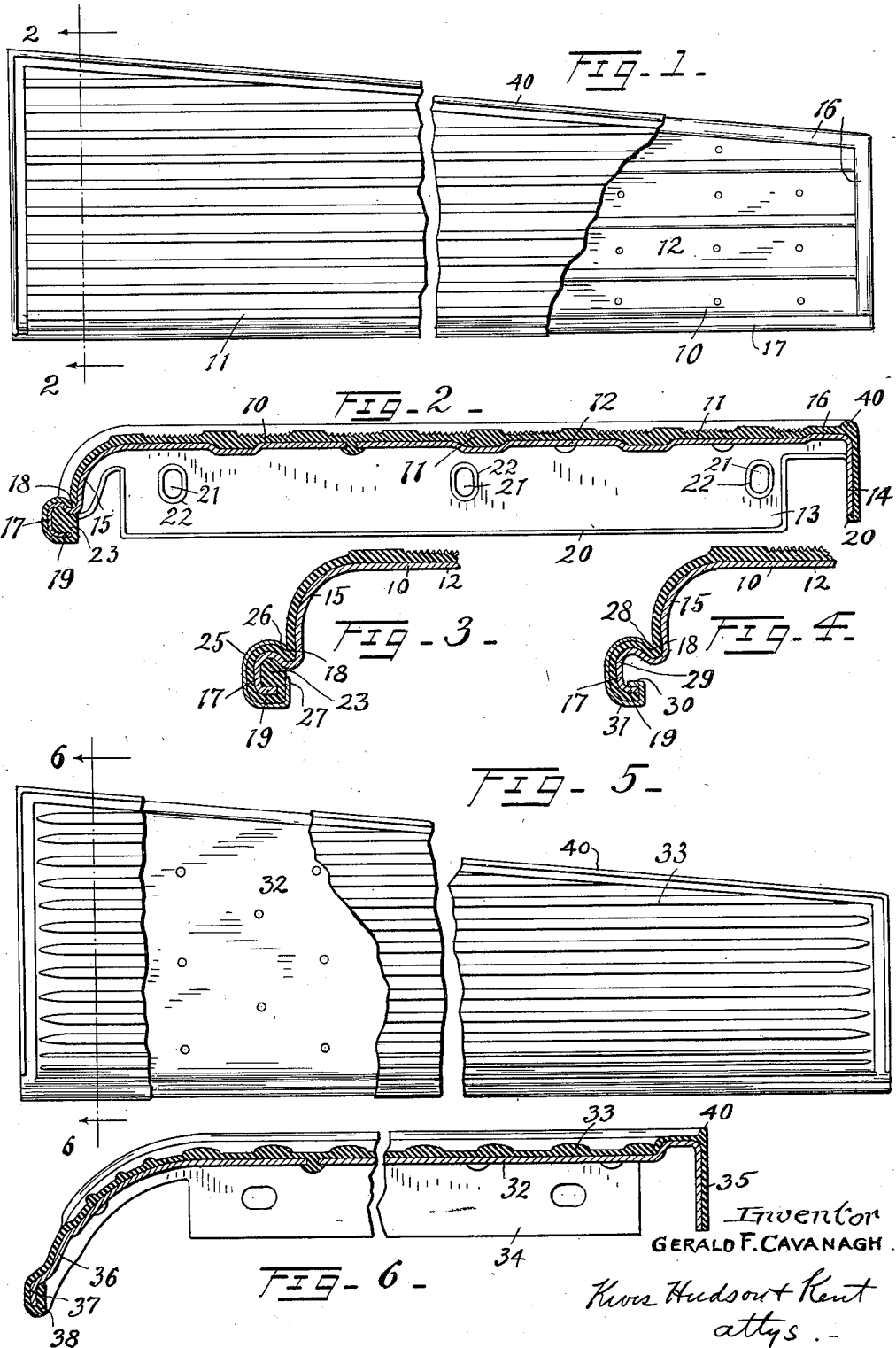

Patented Nov. 5, 1935

2,020,135

UNITED STATES PATENT OFFICE 2,020,135

RUNNING BOARD

Gerald F. Cavanagh, Euclid, Ohio, assignor to The Ohio Rubber Company, Cleveland, Ohio, a corporation of Ohio Application April 29, 1932, Serial No. 608,244

5 Claims. (Cl. 280—163)

This invention relates generally to composite articles, and more particularly to a novel and improved form of vehicle running board.

It is an object of my invention to provide an improved vehicle running board wherein a non-metallic tread or covering is extended over a metal body, and wherein the covering is provided with an integral thickened portion in which an edge of the metal body is embedded.

Another object of my invention is to provide an improved vehicle running board having a metal body and a rubber tread extending thereover, and wherein the metal body has a depending flange with a hollow bead along its lower edge and the rubber tread is carried around the exterior of the bead and extended into the recess of the bead.

A further object of my invention is to provide a vehicle running board of the type referred to, wherein the metal body has a depending front flange with a laterally projecting hollow bead along its lower edge, and wherein the rubber tread extends around the bead and is formed with an integral enlarged tongue filling the hollow of the bead.

The invention may be further briefly summarized as consisting in certain novel combinations and arrangements of parts herein described and particularly set out in the appended claims.

In the accompanying sheet of drawing,

Fig. 1 is a top plan view of a running board constructed according to my invention;

Fig. 2 is a transverse sectional view thereof taken substantially on line 2—2 of Fig. 1;

Fig. 3 is a partial sectional view taken through the front flange of the running board of Fig. 1 but showing a metal sheath applied to the hollow bead;

Fig. 4 is a partial sectional view similar to Fig. 3 but illustrating another manner of applying the metal sheath;

Fig. 5 is a top plan view of another running board constructed according to my invention; and Fig. 6 is a transverse sectional view thereof taken on line 6—6 of Fig. 5.

Detailed reference will now be made to the accompanying drawing wherein I have illustrated preferred forms of my improved running board construction. It should be understood, however, that the invention may be embodied in various other forms of running boards than those herein illustrated.

As shown in Figs. 1 and 2 of the drawing, my improved running board comprises a metallic body 10 and a non-metallic tread or covering 11 which extends over and is secured to the metal body.

The metal body may be of any suitable size or shape, but is preferably quadrangular in form, as shown in Fig. 1, and is preferably constructed as a sheet metal stamping by means of suitable dies or forming apparatus. In constructing the metal body, I prefer to use sheet metal stock known as commercial hot-passed steel because this material possesses an inherently rough or porous surface to which the non-metallic covering 11 can be readily made to adhere.

As illustrated in the drawing, this metal body may be formed with a substantially horizontally extending top portion 12, and with depending flanges 13 at the ends thereof for connection with portions of a vehicle body, such as the front and rear fenders. The metal body is also provided with a depending flange 14 extending along the inner edge thereof for connection with the splash pan or other suitable portion of the vehicle body, and with a depending arcuate flange 15 extending along its front or outer edge. At the junction of the flanges 13 and 14 with the transversely extending top 12, the metal body is preferably provided with upstanding or elevated beads 16 which define a pan-like depression in the top surface of the running board having the transversely extending top 12 and the arcuate flange 15 as its bottom wall. Along the lower edge of the front flange 15 I provide a longitudinally extending hollow bead 17 which projects laterally outwardly beyond the curved upper portion of this flange. In forming this hollow bead, the metal is reversely bent, as shown in Fig. 2 of the drawing, to form the longitudinally extending groove 18, and is curved around to provide the bead with a longitudinally extending recess in the reverse side thereof. In curving the metal around to form the hollow bead, the extreme edge 19 is so disposed relative to the metal forming the groove 18, as to form a longitudinal slot which communicates with the recess of the bead, but which is of reduced width as compared with the width of the bead recess, as shown in Fig. 2.

The covering or tread 11 may be of any suitable non-metallic material, but is preferably formed of soft or resilient rubber which is molded and vulcanized in contact with the metal body. During the vulcanizing operation some of the rubber is forced into the interstices of the hot-passed steel, thereby providing a firm and substantially uniform bond between the rubber and the metal. As shown in Figs. 1 and 2 of the drawing, the rubber covering extends over the top portion 12 and is carried down upon the flanges 13, 14 and 15. In carrying the rubber down upon the flanges 13 and 14 it may be desirable to extend the rubber laterally to form the extensions 20 which cover the extreme edges of these flanges. Likewise, it may be desirable to extend some of the rubber into the openings 21 which are provided in the flanges 13 and 14 for clamping bolts, so that the rubber forms a cover 22 for the edges of these openings, and at the same time provides gaskets around the clamping bolts which extend through the openings.

According to my invention, the rubber covering which is extended down upon the front flange 15 is carried around the exterior of the hollow bead 17 and around the edge 19 thereof, as shown in Fig. 2, and extended into the recess in the reverse side of this bead. During the vulcanizing operation, the rubber covering is molded into the recess of the bead 17, thereby forming a longitudinally extending integral thickened portion 23 constituting a substantial body of rubber in which the edge 19 of the metal body is embedded. In molding the rubber into the recess of the bead, the thickened integral portion 23 substantially fills the recess and, as indicated in Fig. 2, forms a tongue which is retained in the bead because of the reduced width of the longitudinally extending slot. It will be seen from the arrangement just described, that the thickened integral portion molded into the recess of the bead, not only provides a substantial body of rubber in which the extreme edge 19 of the metal body is embedded, but also provides a locking tongue which is retained in the recess of the bead and thereby prevents the edge of the rubber covering from being torn loose from the metal body.

In Fig. 3 of the drawing I have shown how a longitudinally extending sheath or binding strip 25 may be applied to the bead 17 over the rubber covering of the latter. This sheath may be of any appropriate material, but is preferably formed of a soft metal, such as zinc, and is coated with chromium or other substance capable of providing an attractive and wear-resisting finish. In applying this sheath, the edge 26 of a curved metal strip is hooked into the longitudinally extending groove 18 and is pressed against the rubber covering lying in this groove while the body of the strip is bent or curved around the rubber covered bead by a suitable operation, such as a rolling operation, the extreme edge 27 of the metal strip being bent upwardly at a point inwardly of the bead and then pressed outwardly against the integral thickened body of rubber 23 to retain the sheath in place.

When a metal sheath is applied to the front edge of the running board, this sheath acts as a clamping means for preventing the edge of the rubber covering from being torn loose, and, accordingly, on those running boards to which metal sheaths are to be applied, the thickened body of rubber 23 shown in Figs. 2 and 3 may be omitted. When this thickened portion of the rubber covering is omitted, the metal sheath may be applied, as shown in Fig. 4 of the drawing, by hooking the edge 28 of the metal sheath over the top of the rubber covered bead 29 and bending or deflecting the sheath, as by a suitable rolling operation, around the rubber covered bead with the extreme edge 30 of the sheath deflected outwardly into the recess of the bead and pressed against the reverse side of the extreme edge 31 of the metal body.

In Figs. 5 and 6 of the drawing, I have shown another vehicle running board embodying my invention and comprising a metal body 32 having a rubber covering or tread 33 extending over and attached to the same. This metal body is provided with depending flanges 34 at its ends, and with depending flanges 35 and 36 which extend, respectively, along its inner and front edges. The front flange 36 is preferably of arcuate form, as shown in Fig. 6, and terminates in a longitudinally extending lip 37.

The rubber covering or tread 33 is vulcanized in contact with the metal body, and is thereby firmly and substantially uniformly connected to the metal. This rubber covering is extended down upon the flanges 34 and 35, and is also carried down upon the arcuate front flange 36. According to my invention, the portion of the rubber covering which is carried down upon the front flange is extended around the edge portion or lip 37 and is carried upwardly in contact with the reverse side of the metal body in the form of a thickened longitudinally extending body of rubber 38. Since the lip 37 is embedded in this thickened integral body of rubber, as shown in Fig. 6 of the drawing, and the rubber is attached to both surfaces of the metal body at this point, it will be seen that a reliable connection between the rubber and the metal will be provided along the front edge of the running board, such that the rubber covering will not be readily torn loose.

In the running board constructions which I have illustrated, the upper surface of the rubber coverings may, if desired, be molded during the vulcanizing operation to provide the upstanding marginal bead 40 and to provide a suitable surface pattern or configuration within this marginal bead, such as the ribbed patterns illustrated in the drawing.

It should now be readily understood from the foregoing description and accompanying drawing that I have provided a novel and improved form of running board wherein a non-metallic tread extending over a metal body is provided with a thickened integral portion in which an edge of the metal body is embedded. It will also be readily seen that I have provided an improved form of running board wherein the metal body is provided with a hollow bead extending along the lower edge of its front flange, and with a rubber covering or tread which extends over the metal body and is prevented from being torn loose along the exposed front edge of the running board by extending the rubber covering around the hollow bead and into the recess thereof. With the novel running board construction which I have provided the extreme lower front edge or lip of the metal body of the running board is embedded in a substantial body of rubber which is vulcanized to both surfaces of the metal body, thereby affording a strong and reliable connection between the rubber covering and the metal body at this point.

While I have illustrated and described the improved device of my invention in a detailed manner, it should be understood, however, that I do not intend to limit myself to the precise details of construction and arrangements of parts illustrated and described, but regard my invention as including such changes and modifications as do not involve a departure from the spirit of the invention and the scope of the appended claims.

Having thus described my invention, I claim:

1. A running board comprising an elongated sheet metal body having a depending flange extending along the front edge thereof and an integrally formed bead at the lower edge of said flange, said bead being formed with a recess in the reverse side thereof and with a slot of reduced width communicating with said recess, and facing laterally inward and rubber covering vulcanized to said metal body and to said flange, said covering being carried around the exterior of said bead and into said slot and having an integral locking tongue molded into and substantially filling said recess.

2. A running board comprising a sheet metal body having an angularly disposed flange along one edge thereof and a hollow bead extending along the free edge of said flange, a non-metallic tread extending over and substantially uniformly attached to said body, said tread being extended over said flange and carried around the free edge thereof and extended into the hollow of said bead, and a metallic member extending around on said bead and engaging the extended portion of said tread.

3. A running board comprising a sheet metal body having a depending flange along the front edge thereof, said flange being formed with a laterally outwardly projecting hollow bead along its lower edge, a rubber tread substantially uniformly attached to said body and said flange and extended over the exterior of said bead and around into the hollow of the bead, and a metallic sheath extending around said bead in engagement with the rubber covering thereof.

4. A running board comprising a sheet metal body having a top and provided at one edge thereof with a depending flange the lower portion of which constitutes a hollow bead, a non-metallic tread extending over at least a portion of said top and also extending down upon said flange and over the exterior of said bead, and a metal sheath mounted on said bead and extending over the portion of the non-metallic tread thereon and around the rear of the bead.

5. A running board comprising a sheet metal body having a downturned front flange provided at its lower edge with a bead which projects laterally outward from the flange, said bead having a recess in the back thereof opening laterally inward, and a rubber covering extending over the metal body and carried down over said front flange and bead and around into said recess, the rubber covering, including the portion thereof extending over the bead and into the recess thereof, being molded and vulcanized in place on the metal body.

GERALD F. CAVANAGH.